May 8, 1934.  E. E. DRAPER  1,958,036
MEANS FOR MAKING DEPTHOGRAPHS
Filed Dec. 27, 1930  2 Sheets-Sheet 1

INVENTOR
Ernest E. Draper
BY
Harry Lea Dodson
ATTORNEY

May 8, 1934.   E. E. DRAPER   1,958,036
MEANS FOR MAKING DEPTHOGRAPHS
Filed Dec. 27, 1930   2 Sheets-Sheet 2

INVENTOR
Ernest E. Draper
BY Harry Lea Dodson
ATTORNEY

Patented May 8, 1934

1,958,036

UNITED STATES PATENT OFFICE 1,958,036

MEANS FOR MAKING DEPTHOGRAPHS

Ernest E. Draper, Scarsdale, N. Y., assignor to The Perser Corporation, New York, N. Y., a corporation of New York Application December 27, 1930, Serial No. 505,081

9 Claims. (Cl. 95—18)

I have invented a certain new and useful improvement in means for making depthographs, which is a term employed to describe the picture produced by the method and apparatus described in the patent to Clarence W. Kanolt, No. 1,260,682 of March 26, 1918.

In making depthographs by the method employed in the Kanolt patent, a camera, having a line screen consisting of alternate opaque and transparent vertical strips in front of the sensitized plate, is swung in the arc of a circle about an object to be photographed.

The result of this is that a multiplicity of strip images is obtained which, when viewed in conjunction with a lined screen, will have true stereoscopic properties. It has been suggested that by utilizing a wide lens, the resultant effect might be obtained without swinging the mirror through the arc of the circle, as described. The objection to this is that the expense of the lens is so out of proportion as, to all intents and purposes, to be prohibitive for commercial purposes. It has also been suggested that it is possible to substitute for the lens a long concave mirror strip.

As is well known, a concave mirror of spherical or paraboloidal curvature has the property of forming images as does a lens, but utilizes only a single figured surface whereby the expense of manufacturing is greatly reduced. The objection to the use of such a mirror is the limitation that the incident and reflected rays occupy the same space; therefore, it is essential that some means be provided for separating them. This means consists of a semi-transparent plane mirror, which is placed at an angle, preferably of 45° in the path of the incident rays, and which extends the entire length of the concave mirror.

Light from the object passes through a plane of the transparent mirror and is reflected from the concave mirror back to the semi-transparent mirror mounted at 45° and from this same transparent mirror it is again reflected to produce an image on a sensitive plate through a lined screen.

There are two objections to the use of a concave mirror of such large diameter, as is required in order to obtain the requisite results. First and foremost is the expense which is considerable; secondly, it is well known that such mirrors are usually of somewhat inferior optical quality as compared with ones of smaller diameter but which have the same focal length, the reason for this being that the light rays from near the margin of the material are not usually brought to a focus at exactly the same point as the rays from the center.

The object of my invention is to provide for the substitution in the place of the concave mirror of large diameter, such as is required, a plurality of small mirrors so arranged as to produce the results of a single mirror. It is well known that if the concave mirrors have spherical surfaces they may be so arranged that their surfaces form part of a single spherical surface as though they were parts of a single mirror.

The surface that gives a perfectly correct focusing of light from a source at one point upon another is not a spherical surface, but the surface of an ellipsoid of which the two points are the foci. The optical properties of the small mirrors I employ can, therefore, be improved slightly by arranging them not in the arc of a circle but in an arc of a suitable ellipse, a thing difficult, if not impossible, of obtaining, where the concave mirror is a continuous strip.

In the device as hereafter described the rays from the different parts of the mirror, in a horizontal direction, are so arranged that they will be separated by the lined screen and form images in slightly different parts of the photographic plate. Therefore, a multiplicity of small mirrors in the aggregate, comprising considerable length horizontally, can be used without great impairment of the optical results.

My means of accomplishing the foregoing objects may be more readily comprehended by having reference to the accompanying drawings, which are hereunto annexed and are part of this specification; which are more or less diagrammatic, and which are furnished for the purpose of illustrating a manner in which my invention may be utilized without being intended, in any respect, to comprise a limitation on the invention. I do not desire to be understood as limiting myself to the specific structure shown except as such limitations may appear in the hereafter contained claims.

In the drawings:—

Figure 1:
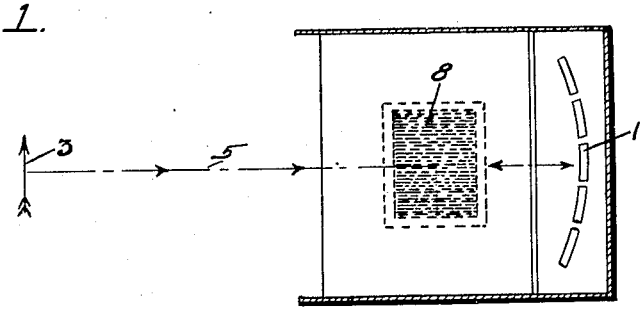
Figure 1 is a diagrammatic plan view of one form of my apparatus.

My invention consists, as shown in the drawings, of a plurality of concave mirrors 1 of spherical or paraboloidal curvature. As illustrated they are shown mounted in a box 2. The object 3, which is to be photographed, is located in advance of the mirrors 1 and beyond the semi-transparent mirror 4 which, as before stated, is mounted at a suitable angle such as 45° in the path of the incident rays 5. A sensitized photographic plate 6 is mounted in the path of the reflected ray 7. A lined screen 8 is interposed between the sensitized plate 6 and the reflected ray 7. The action of the plurality of concave mirrors 1 will be as follows:

The rays of light from the object 3 will pass through the plane of the transparent mirror 4 and will be reflected from the concave mirror 1 back to the semi-transparent mirror 4 and from the mirror 4 it will be again reflected, as diagrammatically illustrated, by the rays 7 to form an image on the sensitized plate 6, through the screen 8, which consists of a plurality of alternate transparent and opaque lines.

Figure 3:
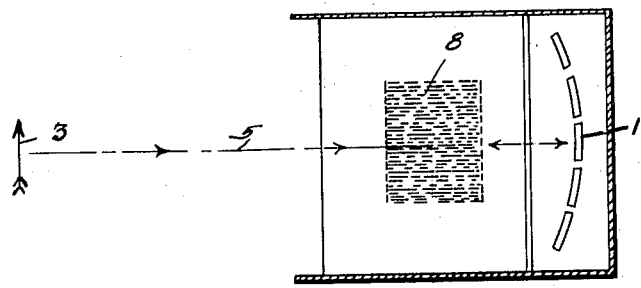
Figure 3 is a view similar to Fig. 1 but where the lined screen is in juxtaposition to a translucent screen such as ground glass and is separated considerably from the camera.
Figure 4:
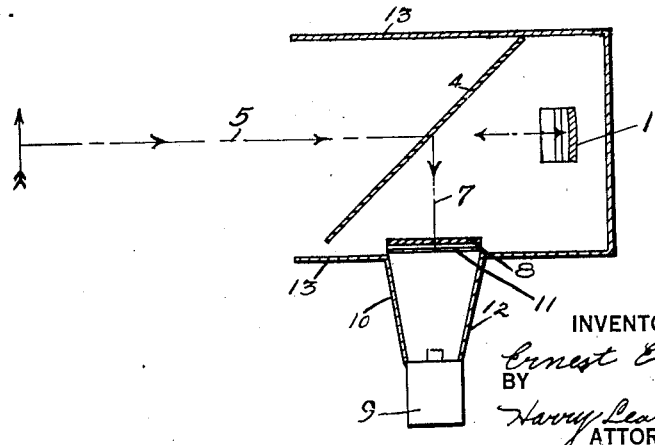
Figure 4 is a side elevation of the device shown in Figure 3.

As shown in Figs. 3 and 4, a camera 9 is located at the rear of a box 10, which is provided with a translucent screen 11, such as ground glass, the lined screen 8 being placed in juxtaposition to this ground glass.

Figure 2:
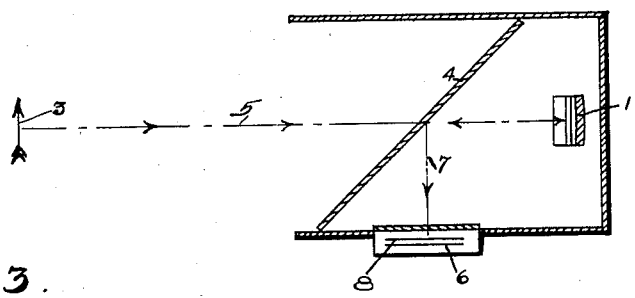
Figure 2 is a side elevation of the same.

This construction is employed to permit the formation of an image on the photographic plate or film of relatively small size. In these figures, the image of the object 3, which is to be photographed, passes in the same manner through the semi-transparent material 4 to the concave mirrors 1, these being just like those of Figs. 1 and 2. The lined screen 8 is in the same location. In juxtaposition to this lined screen is the translucent screen 11, this being of such material as ground glass and it is so located as to receive an image like that received by the photographic plate in Figs. 1 and 2. This image may be photographed in any size desired by means of the camera 9. Opaque screens 12 and 13 are used to keep out stray light.

The device, as described up to this point, is suitable for making depthographic still pictures but cannot be so readily applied for the making of depthographic or stereoscopic motion pictures for two reasons—one is that in all but the device last described the image formed will usually be much too large to be received by the ordinary motion picture film. The other reason is that in pictures made by all of these devices, when viewed in the manner in which motion pictures are sometimes viewed, the stereoscopic effect would be reversed.

Figure 5:
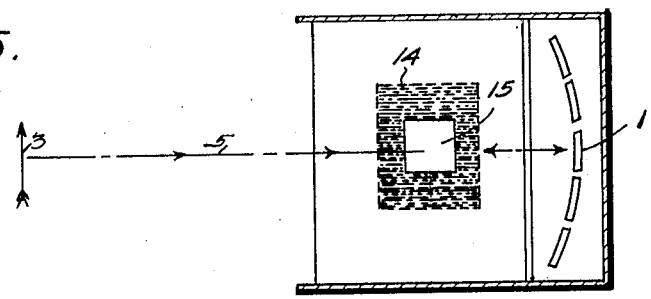
Figure 5 is a diagrammatic plan view where the image is projected upon a ribbed mirror, this permitting the doing away of the lined screen.
Figure 6:
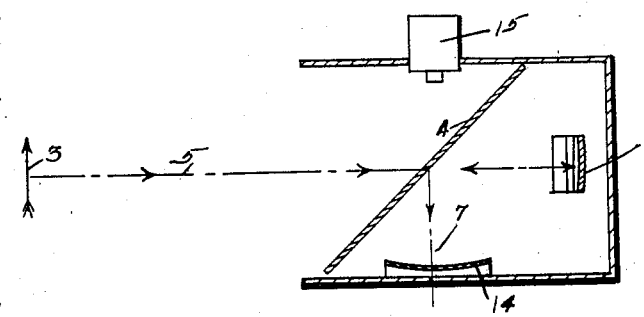
Figure 6 is a side elevation of the same.

In Figs. 5 and 6 is shown a device in which both the difficulties mentioned are overcome. The object 3, to be photographed, is located as before, as are also the concave mirrors 1, and the semi-transparent mirror 4. In the plane of the line screen heretofore described, I mount a spherical ribbed mirror 14, the surface of which is ribbed or ridged with approximately parallel straight ridges. At 15 is a camera arranged to photograph the image formed on the ridged mirror 14. The camera may be either a motion picture camera or one used for making still pictures. It is placed below (or above) the level of the concave mirrors. In place of the camera a television transmitting apparatus could be used.

Figure 7:
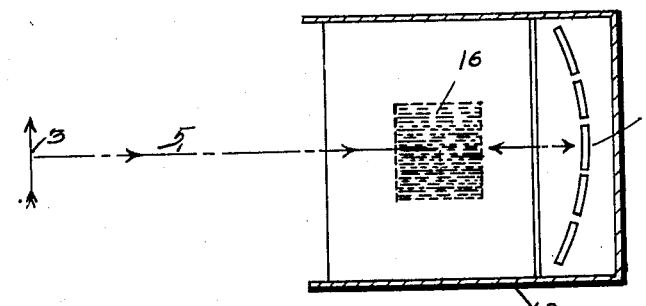
Figure 7 is a diagrammatic plan view where a ribbed lens is used as a substitute for the lined screen.
Figure 8:
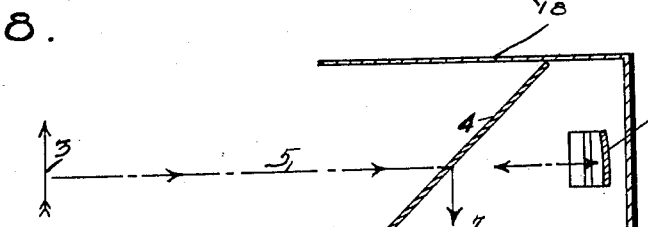
Figure 8 is a side elevation of the same.
Figure 9:
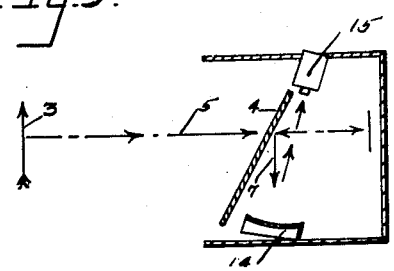
Figure 9 is a diagrammatic view showing a modified arrangement of the camera shown in Fig. 6 with the camera mounted at one side of the semi-transparent mirror.

In Figs. 7 and 8 I have shown a modification in which the ribbed mirror 14 is replaced by a grooved or ribbed lens 16. In this view, the object 3 to be photographed, is located as before. The concave mirrors 1 are employed, as shown in the previous figures. The ribbed lens is mounted in the plane of the ribbed mirror and performs the function of the ribbed mirror.

The lens 16 is so located that the concave mirrors 1 form upon it an image of the object 3. The camera 15, in this modification, is arranged to photograph the image formed on the ribbed lens 16, screens 17 and 18 being arranged to keep out stray light. The camera may be either a still or a motion picture camera. A television transmitter may replace the camera.

Having described my invention, what I regard as new and desire to secure by Letters Patent of the United States, is:

1. Means for making stereoscopic pictures comprising the combination of a plurality of concave mirrors of an aggregate length large as compared with the distance between the eyes, and a semi-transparent mirror of approximately the same length placed at an angle to the path of the incident light to reflect to one side the image formed by the concave mirrors.

2. Means for making stereoscopic pictures comprising the combination of a plurality of concave mirrors of an aggregate length sufficient to produce a stereoscopic effect, and of approximately uniform width, with a semi-transparent mirror of approximately the same length placed at an angle to the path of the incident light to reflect to one side the image formed by the concave mirrors.

3. Means for making stereoscopic pictures comprising the combination of a plurality of concave mirrors of an aggregate length greater than the distance between the eyes, and of approximately uniform width, with a semi-transparent mirror of approximately the same length placed at an angle to the path of the incident light to reflect to one side the image formed by the concave mirrors.

4. Means for making stereoscopic pictures comprising the combination of a plurality of concave mirrors of an aggregate length large as compared with the distance between the eyes, and approximately uniform width, with a semi-transparent mirror of approximately the same length placed at an angle to the path of the incident light to reflect to one side the image formed by the concave mirrors, a line screen located in the path of the reflected image, a translucent screen properly spaced from said line screen, in juxtaposition thereto, a camera arranged to photograph the image formed onto said translucent screen, and opaque screens to keep out stray light.

5. Means for making parallax panoramagrams comprising the combination of a plurality of concave mirrors of an aggregate length large as compared with the distance between the eyes, and of approximately uniform width, with a semi-transparent mirror of approximately the same length arranged at 45° to the path of the incident light to reflect to one side the image formed by the concave mirror, a ribbed mirror in the path of the reflected light, and a camera arranged to photograph the image on said ribbed mirror.

6. Means for making parallax panoramagrams, comprising the combination of a plurality of concave mirrors of an aggregate length large as compared with the distance between the eyes, and of approximately the same width, with a semi-transparent mirror of approximately the same length arranged at 45° to the path of the incident light to reflect to one side the image formed by the concave mirror, a ribbed lens in the path of the reflected light, a camera arranged to photograph the image reflected onto said ribbed lens, and opaque screens to keep out stray light.

7. Means for making stereoscopic pictures comprising the combination of a plurality of concave mirrors of an aggregate length large as compared with the distance between the eyes, a semi-transparent mirror of approximately the same length placed at an angle to the path of the incident light to reflect to one side the image formed by the concave mirrors, and means for separating the image formed by the concave mirrors into elements produced by different parts of said concave mirrors.

8. Means for making stereoscopic pictures comprising the combination of a plurality of concave mirrors of an aggregate length sufficient to produce a stereoscopic effect, and of approximately uniform width, with a semi-transparent mirror of approximately the same length, placed at an angle to the path of the incident light to reflect to one side the image formed by the concave mirrors, and means for separating the image formed by the concave mirrors into elements produced by different parts of said concave mirrors.

9. Means for making stereoscopic pictures comprising the combination of a plurality of concave mirrors of an aggregate length greater than the distance between the eyes, and of approximately uniform width, with a semi-transparent mirror of approximately the same length, placed at an angle to the path of the incident light to reflect to one side the image formed by the concave mirrors, and means for separating the image formed by the concave mirrors into elements produced by different parts of said concave mirrors.

ERNEST E. DRAPER.